(12) United States Patent
Weinenger et al.

(10) Patent No.: US 10,422,299 B2
(45) Date of Patent: Sep. 24, 2019

(54) PISTON WITH ASYMMETRIC UPPER COMBUSTION SURFACE AND METHOD OF MANUFACTURE THEREOF

(71) Applicant: Federal-Mogul, LLC, Southfield, MI (US)

(72) Inventors: Michael Weinenger, Southfield, MI (US); Jeffrey L. Riffe, Troy, MI (US); Timothy Vezina, Northville, MI (US)

(73) Assignee: Tenneco Inc., Lake Forest, IL (US)

( * ) Notice: Subject to any disclaimer, the term of this patent is extended or adjusted under 35 U.S.C. 154(b) by 2 days.

(21) Appl. No.: 15/493,025

(22) Filed: Apr. 20, 2017

(65) Prior Publication Data

US 2017/0306882 A1      Oct. 26, 2017

Related U.S. Application Data

(60) Provisional application No. 62/325,704, filed on Apr. 21, 2016.

(51) Int. Cl.
*F02F 3/28*      (2006.01)
*F02B 23/06*      (2006.01)
(Continued)

(52) U.S. Cl.
CPC ............ *F02F 3/28* (2013.01); *F02B 23/0678* (2013.01); *F02F 3/26* (2013.01);
(Continued)

(58) Field of Classification Search
CPC  F02B 23/0678; F02B 23/0672; F02B 23/069; F02F 2003/0007; F02F 2200/04;
(Continued)

(56) References Cited

U.S. PATENT DOCUMENTS 2,709,992 A * 6/1955 Graves ...................... F02B 3/00
                                                              123/193.1
2,766,738 A * 10/1956 Hoffmann ............... F02B 19/14
                                                              123/269
(Continued)

FOREIGN PATENT DOCUMENTS

EP        0741237 A2    11/1996
JP        2946128 B2     9/1999

OTHER PUBLICATIONS

International Search Report, dated Jul. 24, 2017 (PCT/US2017/028708).

(Continued)

*Primary Examiner* — Marguerite J McMahon
*Assistant Examiner* — Teuta B Holbrook
(74) *Attorney, Agent, or Firm* — Robert L. Stearns; Dickinson Wright, PLLC

(57) ABSTRACT

A galleryless piston and method of construction provide a piston body forged from a single piece of material having an upper combustion surface extending around a longitudinal center axis along which the piston reciprocates for exposure to a combustion chamber of an internal combustion engine. The upper combustion surface has an asymmetric geometry relative to a center plane extending along the central longitudinal axis in generally perpendicular relation to a pin bore axis.

16 Claims, 5 Drawing Sheets

(51) Int. Cl.
*F02F 3/26* (2006.01)
*F02F 3/00* (2006.01)

(52) U.S. Cl.
CPC ... *F02F 2003/0007* (2013.01); *F02F 2200/04* (2013.01); *Y02T 10/125* (2013.01)

(58) Field of Classification Search
CPC .... F02F 3/26; F02F 3/28; F02F 3/0069; F02F 3/14; Y10T 29/49249; Y10T 29/49252; B23P 15/10; F16J 1/001; B22D 15/02
USPC ................................. 123/193.6; 29/888.04
See application file for complete search history.

(56) References Cited

U.S. PATENT DOCUMENTS

| | | | |
|---|---|---|---|
| 4,467,752 A * | 8/1984 | Yunick | F02B 23/08 |
| | | | 123/193.5 |
| 5,103,784 A * | 4/1992 | Evans | F02B 23/08 |
| | | | 123/263 |
| 5,642,706 A | 7/1997 | Wirth et al. | |
| 5,720,253 A * | 2/1998 | Matoba | F02B 23/104 |
| | | | 123/298 |
| 5,778,533 A | 7/1998 | Kemnitz | |
| 5,979,399 A * | 11/1999 | Piock | F02B 23/105 |
| | | | 123/301 |
| 6,062,192 A * | 5/2000 | Wirth | F02B 23/104 |
| | | | 123/295 |
| 6,092,501 A * | 7/2000 | Matayoshi | F02B 23/104 |
| | | | 123/276 |
| 6,487,773 B1 | 12/2002 | Scharp et al. | |
| 7,104,183 B2 | 9/2006 | Huang | |
| 7,472,674 B2 | 1/2009 | Robelet | |
| 7,987,831 B2 | 8/2011 | Seifried | |
| 8,572,843 B2 | 11/2013 | Heraldo et al. | |
| 8,820,288 B2 | 9/2014 | Kaiser et al. | |
| 9,004,037 B2 * | 4/2015 | Muscas | F02F 3/0023 |
| | | | 123/193.1 |
| 9,291,120 B2 | 3/2016 | Matsuo et al. | |
| 9,840,965 B2 * | 12/2017 | Venugopal | F02B 75/282 |
| 9,995,213 B2 * | 6/2018 | Abani | F02B 75/02 |
| 2009/0205607 A1 * | 8/2009 | Levy | F02B 23/0624 |
| | | | 123/276 |
| 2011/0162621 A1 * | 7/2011 | Xu | F02B 23/104 |
| | | | 123/305 |
| 2011/0271932 A1 * | 11/2011 | Fuqua | F01B 7/02 |
| | | | 123/301 |
| 2013/0008307 A1 * | 1/2013 | Will | F16J 15/00 |
| | | | 92/172 |
| 2013/0092123 A1 * | 4/2013 | Straub | F02B 23/0651 |
| | | | 123/298 |
| 2013/0112175 A1 * | 5/2013 | Wahl | F02F 3/16 |
| | | | 123/51 R |
| 2013/0199498 A1 * | 8/2013 | Gabel | F02B 23/0621 |
| | | | 123/445 |
| 2013/0233270 A1 | 9/2013 | Brandt et al. | |
| 2014/0202404 A1 * | 7/2014 | Weinenger | F16J 1/22 |
| | | | 123/41.35 |
| 2014/0238341 A1 * | 8/2014 | Straub | F02B 17/005 |
| | | | 123/301 |
| 2015/0122212 A1 | 5/2015 | Riffe et al. | |
| 2016/0090939 A1 | 3/2016 | Rifle et al. | |
| 2016/0115899 A1 * | 4/2016 | Riffe | F02F 3/0084 |
| | | | 123/193.6 |
| 2016/0123274 A1 | 5/2016 | Miller et al. | |
| 2016/0290224 A1 * | 10/2016 | Abani | F02B 75/02 |

OTHER PUBLICATIONS

Shinichi Goto et al., 999-01-1513 Performance and Emissions of an LPG Lean-Burn Engine for Heavy Duty Vehicles, May 6, 1999, XP055390427, http://papers.sae.org/1999-1-1513/, Abstract; Figure 3c.

Clarke D P et al., Development of a Medium Duty, Turbocharged, Lean Burn Natural Gas Engine, Biennual International Conference on Natural Gas Vehicles, Sep. 22-25, 1992, Goteburg, SE, Sep. 22, 1992, pp. 303-315, XP000391355, Abstract; Figure 1.

Sebastian Wohlgemuth et al, Piston Design Optimization for a Two-Cylinder Lean-Burn Natural Gas Engine-3D-CFD-Simulation and Test Bed Measurements, SAE Technical Paper Series, vol. 1, Apr. 1, 2014, XP055390426, US ISSN: 0148-7191, DOI: 10.4271/2014-01-1326, Abstract; Figures 6, 19.

* cited by examiner

PISTON WITH ASYMMETRIC UPPER COMBUSTION SURFACE AND METHOD OF MANUFACTURE THEREOF

CROSS-REFERENCE TO RELATED APPLICATION

This application claims the benefit of U.S. Provisional Application Ser. No. 62/325,704, filed Apr. 21, 2016, which is incorporated herein by reference in its entirety.

BACKGROUND OF THE INVENTION

1. Technical Field

This invention relates generally to pistons for internal combustion engines and to their methods of manufacture.

2. Related Art

Engine manufacturers are encountering increasing demands to improve engine efficiencies and performance, including, but not limited to, improving fuel economy, reducing oil consumption, improving fuel systems, increasing compression loads and operating temperatures within the cylinder bores, reducing heat loss through the piston, improving lubrication of component parts, decreasing engine weight and making engines more compact, while at the same time decreasing the costs associated with manufacture.

While desirable to increase the cylinder pressure and operation temperature within the combustion chamber, it remains necessary to maintain the temperature of the piston within workable limits. Also, achieving an increase in the cylinder pressure and operation temperature typically comes with a tradeoff in that these desirable "increases" limit the degree to which the piston compression height and overall piston size and mass can be decreased. This is particularly troublesome with typical piston constructions having a closed or partially closed cooling gallery in which oil circulates to reduce the operating temperature of the piston. The cost to manufacture pistons having upper and lower parts joined together along a bond joint to form the closed or partially closed cooling gallery is generally increased due, at least in part, to the joining process used to bond the upper and lower parts together. Further, the degree to which the engine weight can be reduced is impacted by the need to make the aforementioned "cooling gallery-containing" pistons from steel so they can withstand the increase in mechanical and thermal loads imposed on the piston. Further yet, when the piston is formed by welding two pieces together, typically the upper combustion surface needs to be symmetrical with regard to a central plane extend along a longitudinal central axis along which the piston reciprocates. This is the case because otherwise the upper combustion surface, if asymmetrical relative a central plane extending along the central longitudinal axis, would likely be misaligned relative to the desired orientation due to the nature of spinning and stopping the two parts relative to one another during friction welding. Accordingly, the geometry of an upper combustion surface of a friction welded piston is typically symmetrical.

Recently, single piece steel pistons without a cooling gallery have been developed and can be referred to as "galleryless" pistons. Such pistons can provide for reduced weight, reduced manufacturing costs, and reduced compression height. The galleryless pistons are either spray cooled by a cooling oil nozzle, lightly sprayed for lubrication only, or are not sprayed with oil.

Due to the absence of the cooling gallery, the galleryless pistons typically experience higher temperatures than pistons with a conventional cooling gallery. High temperatures can cause oxidation or overheating of an upper combustion surface of the steel piston, which can then cause successive piston cracking and engine failures. High temperatures can also cause oil degradation along an undercrown area of the piston, such as underneath a combustion bowl where the cooling or lubrication oil is sprayed. Another potential problem arising due to high temperatures is that the cooling oil can form a buildup layer of carbon in the area where the cooling or lubrication oil contacts the piston undercrown. This carbon layer can cause overheating of the piston, thereby resulting in the aforementioned cracking and engine failure.

SUMMARY OF THE INVENTION

One aspect of the invention provides a galleryless piston capable of achieving improved performance is provided. The piston is forged from a single piece of steel material and includes an upper combustion surface for exposure to a combustion chamber of the internal combustion engine. The upper combustion surface is formed to include an asymmetric geometry relative to a center plane of the piston, wherein the center plane can extend along a central longitudinal axis in generally perpendicular relation to a thrust axis or in generally perpendicular relation to the pin bore axis.

In accordance with another aspect of the invention, an undercrown surface, located on an opposite side of an upper combustion wall forming the upper combustion surface, extending between a pair of pin bosses and between diametrically opposite skirt panels can be forged to follow or substantially follow the asymmetrical contour of the upper combustion surface. As such, the upper combustion wall can be forged having a generally or substantially constant thickness, which in turn results in enhanced cooling of the upper combustion surface and is believed to potentially reduced buildup of coked oil on the undercrown surface, while at the same time reducing the size and weight of the piston.

In accordance with another aspect of the invention, the asymmetric geometry can be provided by plurality of inclined and/or undulating combustion surfaces, with each of the surfaces being formed on opposite sides of the pin bore axis.

In accordance with another aspect of the invention, the asymmetric geometry can be provided by inclined and/or undulating upper combustion surfaces generally aligned with one another along the direction of the thrust axis.

In accordance with another aspect of the invention, a pair of pockets can be forged in an underside of the upper combustion wall, with each of the pockets being formed radially outwardly from separate pin bosses.

With the piston being forged from a single piece of material, in accordance with one aspect of the present invention, it is made possible to form the asymmetric geometry of the upper combustion surface in a specific and precise orientation relative to the pin bore axis and the desired center plane. Thus, manufacturing time and costs associated therewith, including but not limited to a reduction is scrap, can be reduced when the asymmetric geometry is formed on the single piece forged piston, rather than a piston having multiple parts welded to one another. Further yet, forging eliminates having to perform expensive machining operations to remove excessive amounts of excess material, which both reduce manufacturing time and material waste. In addition, the proper and precise alignment of the asymmetric geometry also contributes significantly to improved performance and increased useful life of the engine.

Another aspect of the invention includes a method of manufacturing a galleryless piston. The method includes forging a single piece of steel material to form the entirety of a body of the piston. During the forging step, the method includes forming an upper combustion surface including an asymmetric geometry in intended orientation relative to a pin bore axis and center plane of the piston, wherein the center plane can extend along a central longitudinal axis, along which the piston reciprocates, in generally perpendicular relation to a thrust axis or in generally perpendicular relation to the pin bore axis.

In accordance with another aspect of the invention, the method can include forging an undercrown surface, located on an opposite side of an upper combustion wall forming the upper combustion surface, extending between a pair of pin bosses and between diametrically opposite skirt panels, having the same or substantially the same contour of the upper combustion surface. As such, the method can include forging the upper combustion wall having a generally or substantially uniform thickness, which in turn results in enhanced cooling of the upper combustion wall and may further result in reduced buildup of coked oil on the undercrown surface thereof, while at the same time reducing the size and weight of the piston.

In accordance with another aspect of the invention, the method can include forging the asymmetric geometry having at least one inclined and/or undulating upper combustion surface aligned along a thrust axis.

In accordance with another aspect of the invention, the method can include forging the asymmetric geometry having a pair of inclined and/or undulating upper combustion surfaces, with each of the surfaces being forged on opposite sides of the pin bore axis.

In accordance with another aspect of the invention, the method can include forging the asymmetric geometry having inclined and/or undulating upper combustion surfaces generally aligned with one another along the direction of the thrust axis.

In accordance with another aspect of the invention, the method can include forging a pair of pockets in an underside of the upper combustion wall, with each of the pockets being forged radially outwardly from separate pin bosses.

BRIEF DESCRIPTION OF THE DRAWINGS

These and other aspects, features and advantages of the invention will become more readily appreciated when considered in connection with the following detailed description and accompanying drawings, in which.

DETAILED DESCRIPTION OF PRESENTLY PREFERRED EMBODIMENTS

Figure 1:
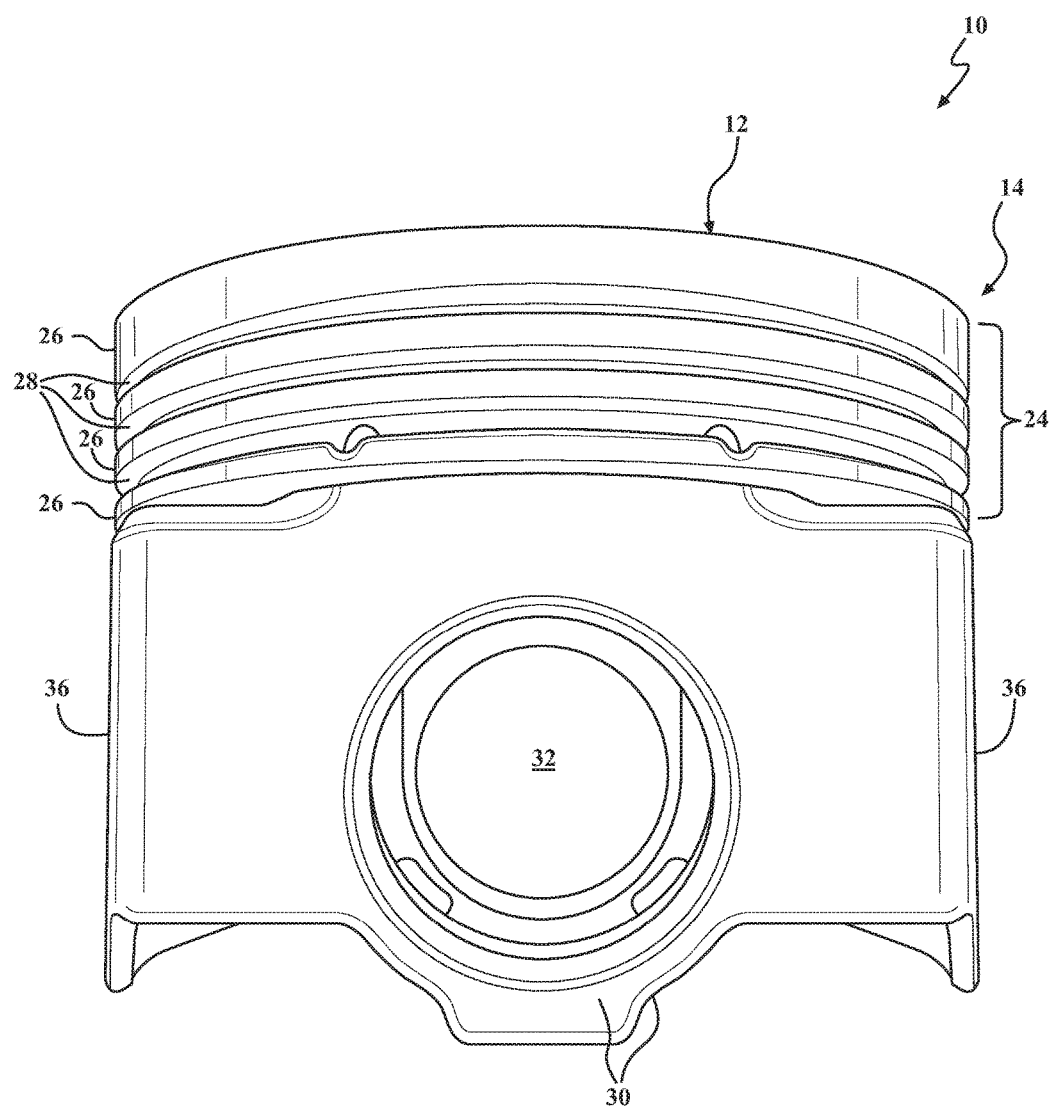
FIG. 1 is a side view of a galleryless piston manufactured in accordance with one aspect of the invention.

Referring in more detail to the drawings, FIGS. 1-5 illustrate views of a galleryless piston 10 constructed in accordance with an example embodiment for reciprocating movement in a cylinder bore or chamber (not shown) of an internal combustion engine, such as a modern, compact, high performance vehicle engine, for example. The piston 10, being "galleryless," does not have a cooling gallery floor or other cooling gallery features that would tend to suspend oil in a region 14 of the piston crown 16, and thus, not having the added material that would be needed to form a cooling gallery, the piston 10 has a relatively reduced size and weight and operates at a relatively reduced temperature, which contributes to improved thermal efficiency, fuel consumption, and running performance of the engine.

As shown in the Figures, the piston 10 has a monolithic piston body, referred to hereafter as body 11, forged from a single piece of metal material, such as steel, though it is contemplated that other materials, such as aluminum, titanium, or other structural metal, could be used. Accordingly, the piston 10 does not have a plurality of parts joined together, such as upper and lower parts joined to one another, which is commonplace with pistons having enclosed or partially enclosed cooling galleries bounded or partially bounded by a cooling gallery floor.

The body 11, being made of steel or another metal, is strong and durable to meet the high performance demands, i.e. increased temperature and compression loads, of modern day high performance internal combustion engines. The steel material used to construct the body can be an alloy, such as the SAE 4140 grade or different, depending on the requirements of the piston 10 in the particular engine application. Due to the piston 10 being galleryless, the weight and compression height of the piston 10 can be greatly reduced relative to a piston having a cooling gallery, thereby allowing an engine in which the piston 10 is deployed to achieve a reduced weight and to be made more compact, thereby allowing the overall outer size of the engine to be reduced. Further yet, even though the piston 10 is galleryless, the piston 10 can be sufficiently cooled during use, due to structural and method of manufacture advances discussed hereafter, to withstand the most severe operating temperatures, thereby owing, at least in part, to the ability of the piston to resist carbon buildup on an undercrown surface 13, thus, further enhancing the performance of the piston 10 and engine.

Figure 4:
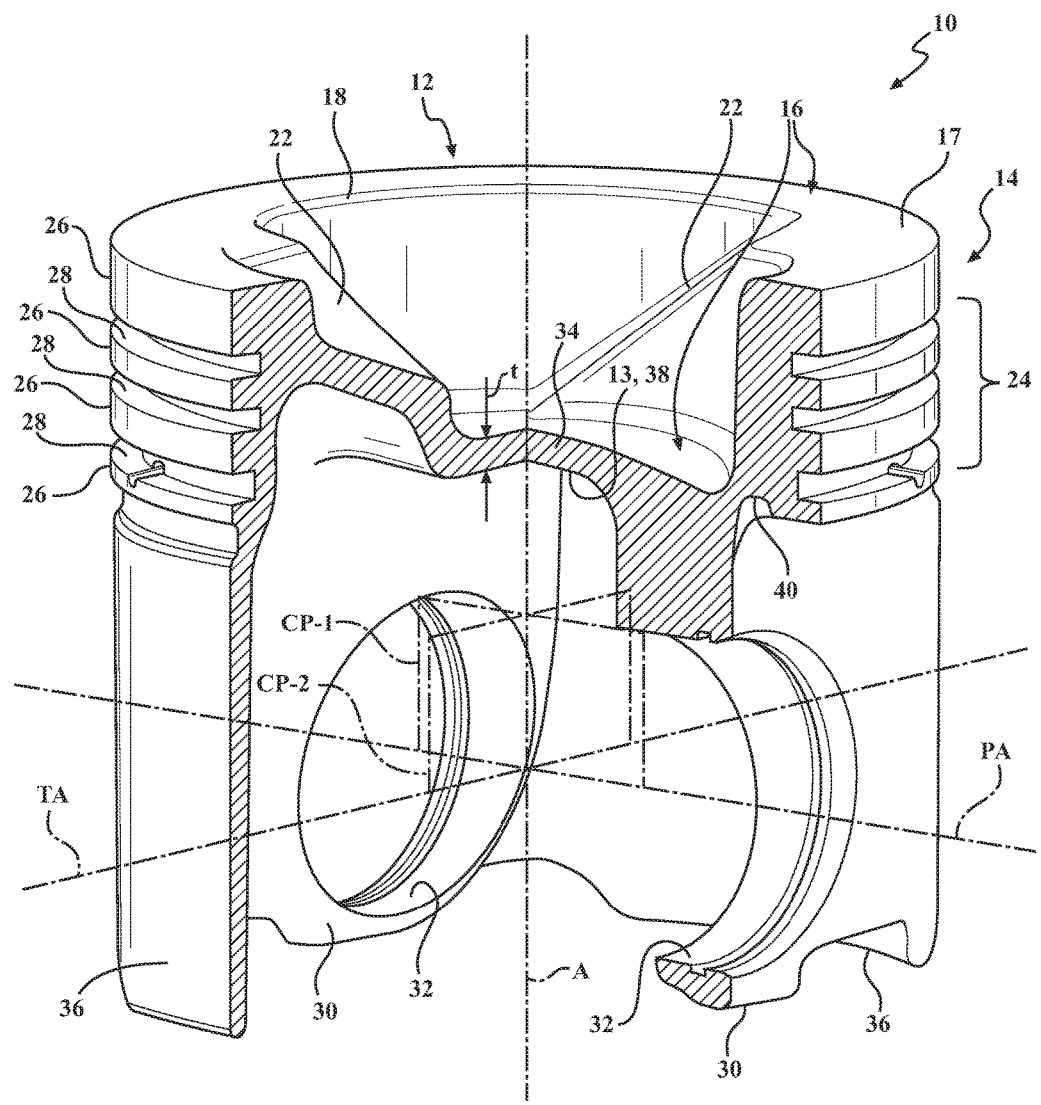
FIG. 4 is a cross-sectional perspective view of the piston of FIG. 1 taken generally along the line 4-4 of FIG. 2.

The body 11 of the piston 10 has the upper crown or simply crown 16, also referred to as an upper combustion surface 16, extending around a longitudinal center axis A, along which the piston reciprocates, with the upper combustion surface 16 being configured in accordance with one aspect of the invention for optimal exposure to and circulation/mixing of combustion gasses within the combustion bowl 12 and combustion chamber of the engine. The upper combustion surface 16 has first and second portions, with the first portion 17 extending annularly in planar or generally planar form adjacent an outer periphery of the upper combustion surface 16 and the second portion forming the combustion bowl 12 depending from the first portion 17. The combustion bowl 12 is forged to have an asymmetric geometry relative to a center plane of the piston, wherein, as best shown in FIG. 4, the center plane can be a center plane CP-1 that extends along the central longitudinal axis A in generally perpendicular relation to a thrust axis TA and generally along or in parallel relation with a pin bore axis PA, and/or the center plane can be a center plane CP-2 that extends along the central longitudinal axis A and in generally perpendicular relation to the pin bore axis PA and generally along or in parallel relation with the thrust axis TA. Due to the asymmetric geometry of the upper combustion surface 16 and combustion bowl 12 depending therein, certain areas of the region 14 can include more material, in surface area and volume, than other areas to improve performance of the piston 10. For example, areas of the upper combustion surface 16 which are most prone to wear can include more material than other areas which are less prone to wear, such as generally along the region of the thrust axis TA.

Figure 2:
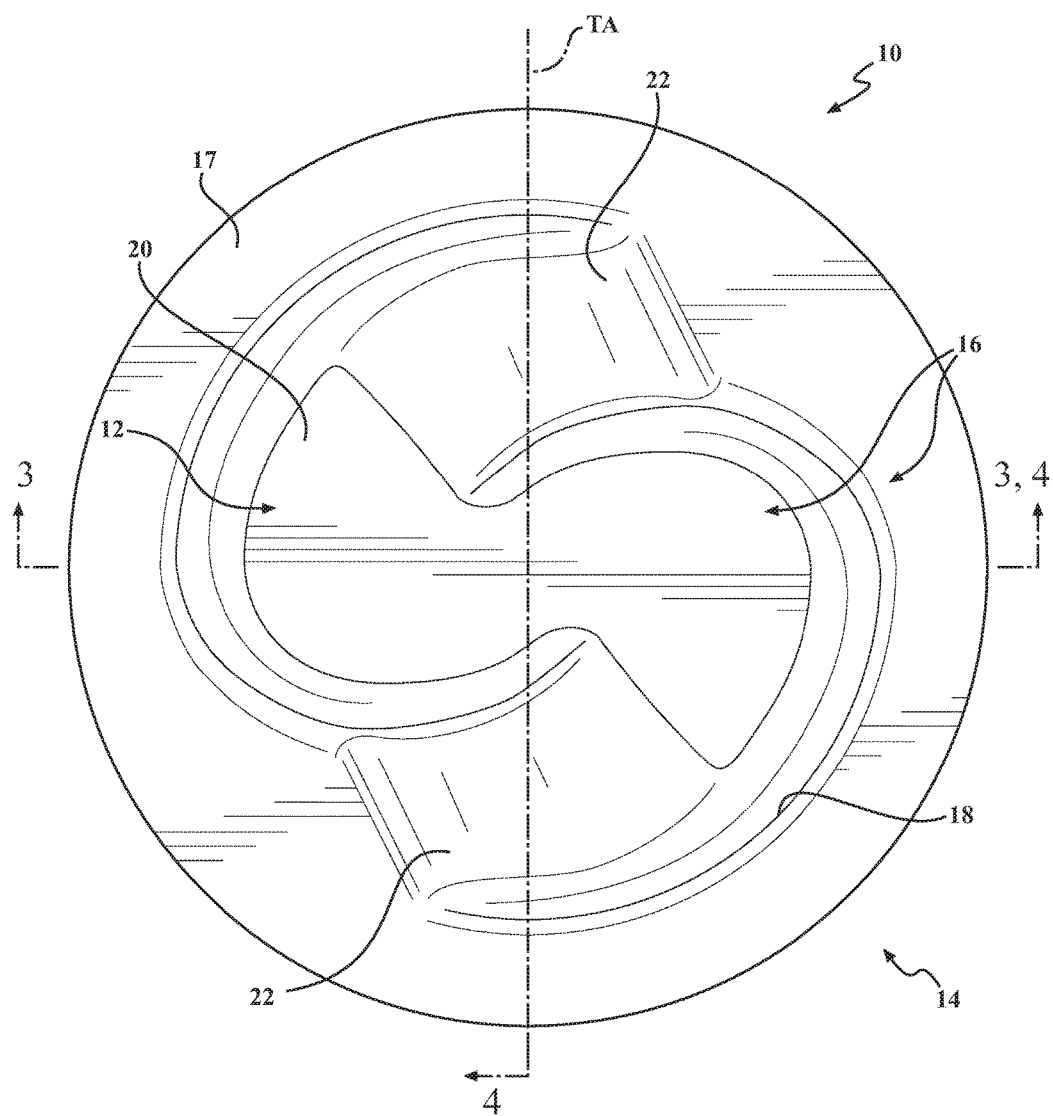
FIG. 2 is a top plan view of the piston of FIG. 1 illustrating an asymmetric combustion bowl in accordance with another aspect of the invention.
Figure 3:
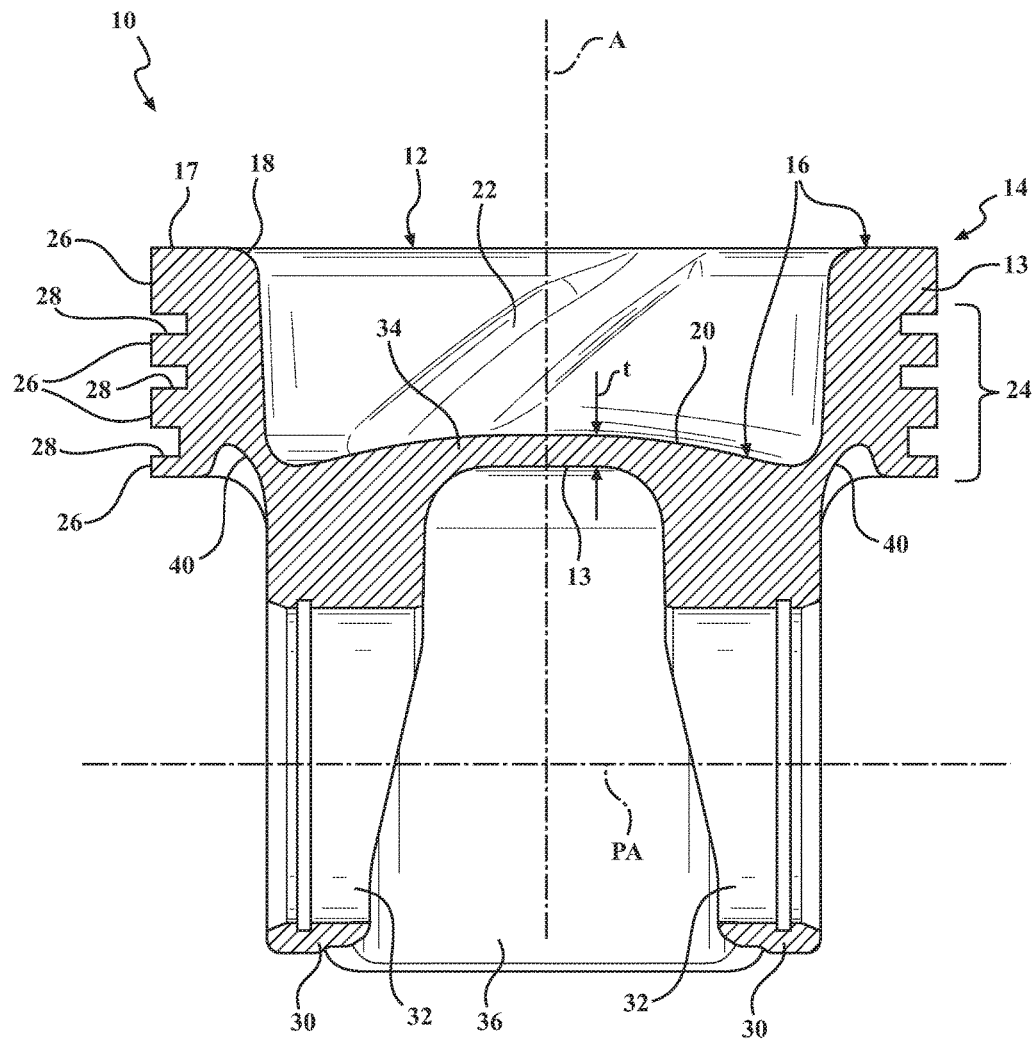
FIG. 3 is a cross-sectional side view taken generally along the line 2-2 of FIG. 2, coinciding with a pin bore axis of the piston of FIG. 1.

In one example embodiment, as shown in FIGS. 2-4, the upper combustion surface 16 includes an annular outer combustion bowl rim, referred to hereafter as outer rim 18, surrounding the center axis A and combustion bowl 12, with the combustion bowl 12 depending from and extending from the outer rim 18 radially inwardly to the center axis A. The upper combustion surface 16 within the combustion bowl 12 also includes at least one, and shown, by way of example and without limitation, as a pair of features 22 that form the asymmetry of the upper combustion surface 16 and lend to the ability of the piston 10 to attain a reduced size, weight, and increased performance, including withstanding increased temperatures and combustion forces, and further lend to an increased useful life, such as by inhibiting the buildup of deposits on the piston 10. The features 22 are shown, by way of example and without limitation as inclined surfaces (inclined is intended to mean the surfaces extend in oblique relation to a plane extending transversely to the central longitudinal axis A) and/or undulating surfaces (undulating is intended to mean the surfaces can be other than flat or planar), such as inclined ramp-like regions, and referred to hereafter simply as ramps 22, extending upwardly from a floor 20 of the combustion bowl 12 to (into smooth transition with), or generally to (close proximity to) the outer rim 18. The ramps 22 extend over an arcuate path, and are shown as extending circumferentially at least partially about the central longitudinal axis A in smooth (non-stepped) descending fashion from (smooth transition from), or substantially from (slight axial offset from) the outer rim 18 to the floor 20 of the bowl 12, by way of example and without limitation. The ramps 22 provide the upper combustion surface 16 with the asymmetric geometry, such that without the ramps 22, the upper combustion surface would be symmetrical relative to the center planes CP-1, CP-2 and would not likely result in the performance benefits discusses above and further hereafter. It is to be recognized that other configurations of the features 22 than shown can be used to achieve the asymmetric geometry and performance enhancements provided thereby. For example, the piston 10 could include any of the combustion bowl designs disclosed in U.S. Pat. No. 9,243,582, which is incorporated herein by way of reference with regard to the configuration of the combustion bowls disclosed therein. However, unlike the piston of the incorporated '582 patent, the piston 10 according to the present invention is forged from a single piece of material, not welded, and the undercrown surface 13 is forged, not machined. In addition, as discussed above, the piston 10 of the present invention does not include a closed or partially closed cooling gallery.

As shown in the exemplary embodiment, the piston 10 also includes a ring belt region 24 depending from the upper combustion surface 16 and extending circumferentially along an outer diameter of the piston 10. The ring belt region 24 includes a plurality of lands 26 separated from one another by ring grooves 28. The piston 10 is illustrated having three ring grooves 28, but a piston 10 manufactured in accordance with the invention could alternatively include fewer or more ring grooves 28.

The piston 10 further includes a pair of pin bosses 30 depending generally from the undercrown surface 13 radially inwardly of the ring belt region 24. The pin bosses 30 provide a pair of laterally spaced pin bores 32 which are vertically spaced from the undercrown surface 13 and coaxially aligned with one another along the pin bore axis PA. The piston 10 also includes a pair of skirt panels 36 depending from the ring belt region 24 and extending diametrically opposite one another along opposite sides of the pin bore axis PA.

Figure 5:
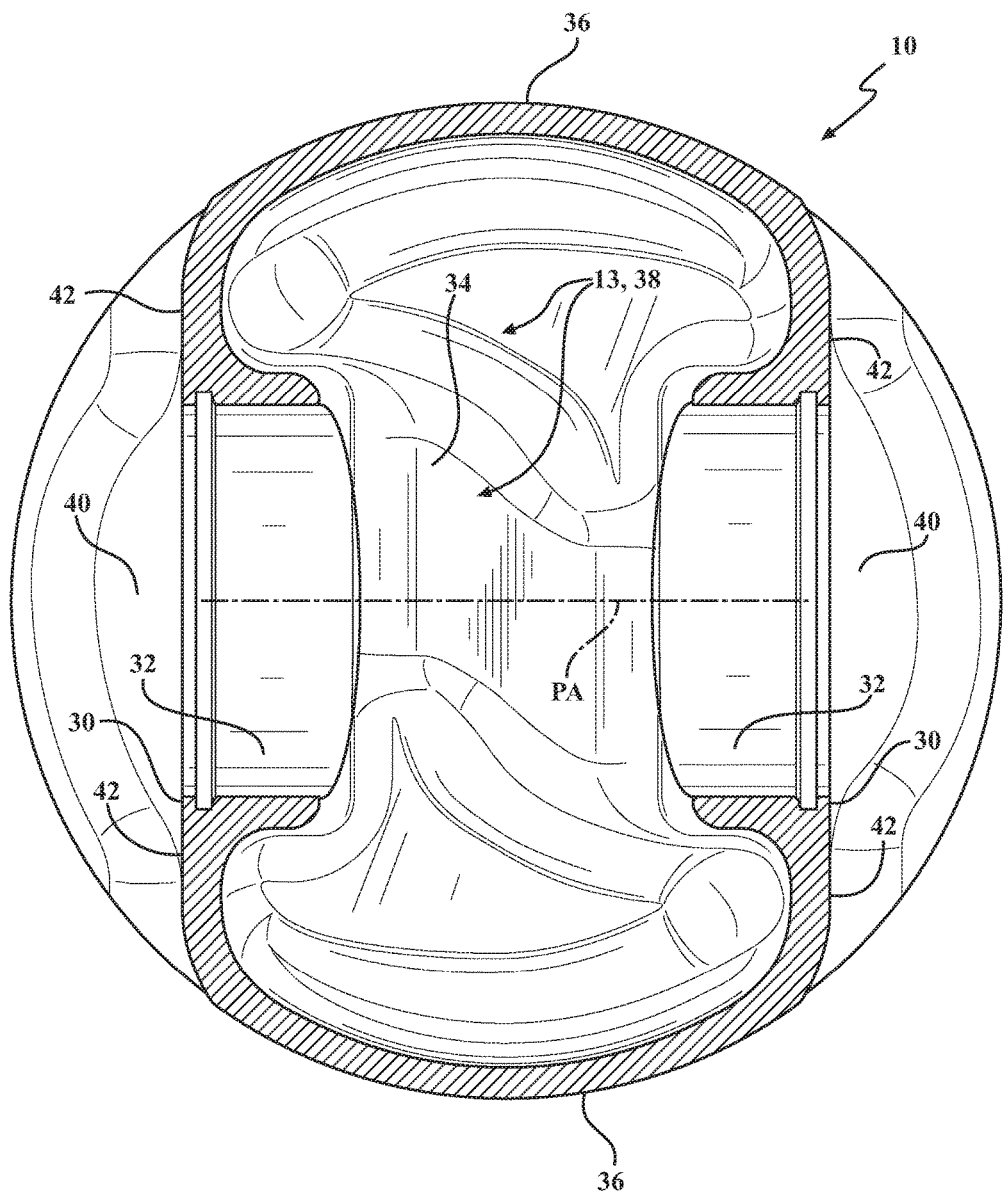
FIG. 5 is a cross-sectional bottom plan view taken generally along the pin bore axis of the galleryless piston of FIG. 1.

As best shown in FIG. 5, the undercrown surface 13 of the example piston 10 of FIG. 2 is formed on an underside of an upper combustion wall 34 of the crown 16, directly opposite the crown 16 and radially inwardly of the ring belt region 24. For cooling purposes, the undercrown surface 13 is preferably spaced a minimum distance from the combustion bowl 12, though it is recognized that a thickness (t) of the upper combustion wall 34 must be sufficient to withstand combustion forces, and is substantially the surface on the direct opposite side of the upper combustion wall 34 from the combustion bowl 12. Accordingly, the thickness (t) of the upper combustion wall 34 can be optimized to provide a minimum but sufficient generally constant or substantially constant thickness (t) (generally and substantially are intended to mean that slight variances in thickness, as would be recognized by those skilled in the art, are contemplated, such as between about 0-10%, and more preferably between about 0-5%, and more preferably yet between about 0-2% variance in thickness over the generally and substantially constant thickness regions) between the combustion bowl 12 and the undercrown surface 13 in the forging process, thereby enhancing the cooling effectiveness of the upper combustion wall 34 from oil splashing on the undercrown surface 13 during use, while also being able to withstand the high performance combustion forces and minimize the weight of the piston 10. As such, the undercrown surface 13 can be forged having a contoured asymmetrical geometry corresponding to (following) the asymmetric geometry of the upper combustion surface 16, such the undercrown surfaces disclosed in the '582 patent; however, the contour of the undercrown surface 13 is formed to net-shape (finished use shape) in the forging process along with the upper combustion surface 16, unlike in the '582 patent which requires machining. The undercrown surface 13 is considered herein to be the surface that is visible, excluding the pin bores 32 when observing the piston 10 straight on from the bottom, as shown in FIG. 5. The undercrown surface 13 is also openly exposed, as viewed from an underside of the piston 10 and it is not bounded by an enclosed or partially enclosed cooling gallery, or any other features tending to retain oil or a cooling fluid near the undercrown surface 13. The undercrown surface 13 can be formed having various configurations, other than those disclosed in the Figures of the present application, as similarly noted for the asymmetrical upper combustion surface.

According to the example embodiment, the undercrown surface 13 of the piston 10 has greater a total surface area (3-dimensional area following the contour of the surface)

and a greater projected surface area (2-dimensional area, planar, as seen in plan view) than comparative pistons having a closed or partially closed cooling gallery. This open region along the underside of the piston 10 provides direct access for oil to be splashed or sprayed from within the crankcase directly onto the "as forged" asymmetrical undercrown surface 13, thereby allowing the entire undercrown surface 13 to be splashed directly by oil from within the crankcase, while also allowing the oil to freely splash about the wrist pin (not shown), and further, significantly reduce the weight of the piston 10. Accordingly, although not having a typical closed or partially closed cooling gallery, the generally open configuration and reduced, generally constant wall thickness (t) of the upper combustion wall 34, other than directly above the pin bosses 30, of the galleryless piston 10 allows optimal cooling of the undercrown surface 13 and lubrication to the wrist pin joint within the pin bores 32, while at the same time greatly reducing oil residence time (the time in which a volume of oil remains on a surface) on the surfaces near the combustion bowl 12. The reduced residence time can reduce unwanted build-up of coked oil, such as can occur in pistons having a closed or substantially closed cooling gallery. As such, the piston 10 can remain "clean" over extended use, thereby allowing it to remain substantially free of coke build-up, thereby maintaining maximum cooling efficiency.

The undercrown surface 13 of the piston 10 shown in FIGS. 4 and 5 is provided by several regions, including an inner undercrown region 38 and outer pockets 40. A first portion of the undercrown surface 13 located at and immediately adjacent the center axis A is provided by an inner undercrown region 38. The inner undercrown region 38 extends between and is surrounded by the pin bosses 30, skirt panels 36, and struts 42. The 2-dimensional and 3-dimensional surface area of the undercrown surface 13 provided by the inner undercrown region 38 is typically maximized by its asymmetry, following the asymmetry of the combustion bowl 12, so that cooling caused by oil splashing or being sprayed upwardly from the crankcase against the exposed inner undercrown region 38 can be enhanced, thereby lending to exceptional cooling of the piston 10. In the example embodiment illustrated, the inner undercrown region 38 of the undercrown surface 13 is concave, when viewed from the bottom, such that oil can be channeled during reciprocation of the piston 10 from one side of the piston 10 to the opposite side of the piston 10, thereby acting to further enhance cooling of the piston 10.

A second region of the undercrown surface 13 is provided by the outer pockets 40 which are located radially outwardly of the pin bosses 30. Each outer pocket 40 is surrounded by one of the pin bosses 30, portions of the struts 42 that connect the skirt panels 36 to the pin bosses 30, and a portion of the ring belt region 24.

Another aspect of the invention provides a method of manufacturing the galleryless piston 10 with the asymmetric combustion bowl 12. The body portion of the piston 10 is formed by forging a single piece of steel material. The forging step includes forming the upper combustion wall 34 to include the upper combustion surface 16 having the asymmetric geometry in the select areas of the combustion bowl 12. In other words, the piston 10 is preformed, without need of subsequent machining, with the asymmetric geometry formed within the combustion bowl 12 in the forging process. The forging step can also include forming the other features of the piston 10 including the ring belt region 24, pin bosses 30, skirt panels 36, inner undercrown region 38, and outer pockets 40, as described above. The forging step is simpler and more efficient than welding two pieces of material. After forging the single piece of steel material, the method typically includes finish machining the ring belt region 24, pin bosses 30, and skirt panels 36. The method can optionally include finish machining the combustion bowl 12, but preferably the combustion bowl 12 is completely formed to net shape during the forging step and no finish machining is required.

The single piece forged piston 10 with the asymmetric geometry on the upper combustion surface 16 provides advantages over welded pistons. It is typically important to align the asymmetric geometry provided by the undulating/inclined regions 22 on the upper combustion surface 16 in a specific location relative to the pin bore axis 34 and central planes CP-1, CP-2. The specific location varies depending on the design of the engine in which the piston 10 is used. If the piston were to be formed by welding two pieces together, it would be difficult at best, and more likely impossible to align an asymmetric geometry of the upper combustion surface in the desired location relative to a center plane. However, when the piston 10 is forged from a single piece of material in accordance with the present disclosure, it is not only possible, but relatively easy to align the asymmetric geometry of the features on the upper combustion surface in the correct location relative to the center planes CP-1, CP-2. Thus, manufacturing time and costs can be greatly reduced when the asymmetric geometry is provided on the single piece forged piston 10 in comparison to a welded piston, if even possible. In addition to the time and cost savings offered by the disclosure herein, the proper alignment of the asymmetric geometry attained thereby is believed also contribute significantly to weight and size reductions of an engine and to the improved performance of the engine.

Many modifications and variations of the present invention are possible in light of the above teachings and may be practiced otherwise than as specifically described while remaining within the scope of the claims. It is contemplated that all features of all claims and of all embodiments can be combined with each other, so long as such combinations would not contradict one another.

What is claimed is:

1. A galleryless piston for an internal combustion engine, comprising:

a monolithic piston body extending along a central longitudinal axis along which said piston reciprocates in a cylinder bore of an internal combustion engine, said piston body having an upper combustion wall forming an upper combustion surface with an annular ring belt region depending from said upper combustion surface for receipt of at least one piston ring;

a pair of skirt panels depending from said ring belt region to facilitate guiding the piston within a cylinder bore and having a pair of pin bosses providing a pair of laterally spaced pin bores aligned along a pin bore axis for receipt of a wrist pin;

said upper combustion surface having first and second portions, said first portion extending annularly along an outer periphery of said upper wall and said second portion forming a combustion bowl extending downward from said first portion, said combustion bowl being symmetric relative to said central longitudinal axis;

said upper combustion wall having an undercrown surface formed on an underside of said combustion bowl directly opposite said second portion of said upper combustion surface, said second portion of said upper combustion surface having an asymmetric geometry relative to a center plane extending along said central longitudinal axis and perpendicular to said pin bore axis;

said asymmetric geometry of said upper combustion surface including inclined upper combustion surfaces spaced from one another about said central longitudinal axis;

said undercrown surface having an asymmetric geometry relative to said center plane; and said undercrown surface opposite said inclined upper combustion surfaces having a contour following a contour of said inclined surfaces.

2. The piston of claim 1, wherein said upper combustion wall has a substantially constant thickness.

3. The piston of claim 1, wherein said asymmetric geometry includes a pair of said inclined upper combustion surfaces formed on opposite sides of said pin bore axis.

4. The piston of claim 3, wherein said inclined upper combustion surfaces are generally aligned with one another along the direction of a thrust axis extending transversely to said pin bore axis.

5. The piston of claim 3, wherein said inclined upper combustion surfaces extend upwardly from a floor of the combustion bowl to said first portion of said upper combustion surface.

6. The piston of claim 5, wherein said inclined upper combustion surfaces extend circumferentially relative to said central longitudinal axis.

7. The piston of claim 6, wherein said pair of inclined upper combustion surfaces ascends from said floor in one of a clockwise direction or counterclockwise direction relative to said central longitudinal axis.

8. The piston of claim 1, wherein said combustion bowl includes a floor and a side surface extending upwardly from said floor to said first portion of said upper combustion surface, said asymmetric geometry includes a pair of said inclined upper combustion surfaces, said inclined upper combustion surfaces extend upwardly from a floor of said combustion bowl to said first portion of said upper combustion surface, said inclined upper combustion surfaces are disposed radially inwardly relative to said side surface of said combustion bowl, and said inclined upper combustion surfaces extend circumferentially relative to said central longitudinal axis.

9. A method of manufacturing a galleryless piston for an internal combustion engine, comprising:

forging a monolithic piston body having a central longitudinal axis along which the piston reciprocates in a cylinder bore of an internal combustion engine, the monolithic piston body having the following:

an upper combustion wall forming an upper combustion surface and an undercrown surface opposite the upper crown;

a pair of skirt panels depending from the upper combustion wall;

a pair of pin bosses having a pair of laterally spaced pin bores aligned along a pin bore axis for receipt of a wrist pin;

the upper combustion surface having first and second portions, the first portion extending annularly adjacent an outer periphery of the upper combustion wall and the second portion forming a combustion bowl extending downward from the first portion, the combustion bowl being symmetric relative to the central longitudinal axis, wherein the second portion is forged having an asymmetric geometry relative to a center plane extending along the central longitudinal axis and perpendicular to the pin bore axis;

the asymmetric geometry of the upper combustion surface including inclined upper combustion surfaces spaced from one another about the central longitudinal axis;

the undercrown surface having an asymmetric geometry relative to the center plane; and the undercrown surface opposite the inclined upper combustion surfaces having a contour following a contour of the inclined surfaces.

10. The method of claim 9, further including forging the upper combustion wall to have a substantially constant thickness.

11. The method of claim 9, further including forging a pair of the inclined upper combustion surfaces on opposite sides of the pin bore axis.

12. The method of claim 11, further including forging the inclined upper combustion surfaces to be generally aligned with one another along the direction of a thrust axis extending transversely to the pin bore axis.

13. The method of claim 9, further including forging the inclined upper combustion surfaces to extend upwardly from a floor of the combustion bowl to the first portion of the upper combustion surface.

14. The method of claim 13, further including forging the inclined upper combustion surfaces to extend circumferentially at least partially about the central longitudinal axis.

15. The method of claim 14, further including forging the inclined upper combustion surfaces to ascend from the floor in one of a clockwise direction or counterclockwise direction relative to the central longitudinal axis.

16. The method according to claim 9, wherein the combustion bowl includes a floor and a side surface extending upwardly from the floor to the first portion of the upper combustion surface, the asymmetric geometry includes a pair of the inclined upper combustion surfaces, the inclined upper combustion surfaces extend upwardly from a floor of the combustion bowl to the first portion of the upper combustion surface, the inclined upper combustion surfaces are disposed radially inwardly relative to the side surface of the combustion bowl, and the inclined upper combustion surfaces extend circumferentially relative to the central longitudinal axis.

* * * * *